(12) United States Patent
Morimura et al.

(10) Patent No.: US 10,759,329 B2
(45) Date of Patent: Sep. 1, 2020

(54) OUT-OF-VEHICLE NOTIFICATION DEVICE

(71) Applicant: TOYOTA JIDOSHA KABUSHIKI KAISHA, Toyota-shi, Aichi (JP)

(72) Inventors: Junichi Morimura, Sunto-gun (JP); Seiji Arakawa, Sunto-gun (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 16/382,369

(22) Filed: Apr. 12, 2019

(65) Prior Publication Data

US 2019/0344703 A1 Nov. 14, 2019

(30) Foreign Application Priority Data

May 10, 2018 (JP) .................................. 2018-091248

(51) Int. Cl.
*B60Q 1/26* (2006.01)
*B60Q 1/28* (2006.01)
*B60Q 1/46* (2006.01)
*B60Q 1/34* (2006.01)

(52) U.S. Cl.
CPC ............ *B60Q 1/2607* (2013.01); *B60Q 1/28* (2013.01); *B60Q 1/346* (2013.01); *B60Q 1/46* (2013.01); *B60Q 1/2696* (2013.01)

(58) Field of Classification Search
CPC ........ B60Q 1/2607; B60Q 1/28; B60Q 1/346; B60Q 1/46; B60Q 1/2696
See application file for complete search history.

(56) References Cited

U.S. PATENT DOCUMENTS

2017/0267167 A1* 9/2017 Sakata .................... B60Q 1/38

FOREIGN PATENT DOCUMENTS

| GB | 2531084 | * 12/2014 | ............. B60Q 1/525 |
| GB | 2 531 084 A | 4/2016 | |

* cited by examiner

*Primary Examiner* — Quan-Zhen Wang
*Assistant Examiner* — Mancil Littlejohn, Jr.
(74) *Attorney, Agent, or Firm* — Sughrue Mion, PLLC

(57) ABSTRACT

An out-of-vehicle notification device includes a light emitting unit, a light emission control unit configured to cause the light emitting unit to flicker corresponding to a traveling state of a host vehicle in a forward-backward direction, a blinker configured to perform notification about a steering direction with respect to an outside of the host vehicle by using light, a blinker control unit configured to cause the blinker to flicker based on an operation instruction for the blinker, and a flickering adjustment unit configured to adjust timing of flickering at which the light emitting unit is caused to flicker by the light emission control unit and timing of flickering at which the blinker is caused to flicker by the blinker control unit.

2 Claims, 4 Drawing Sheets

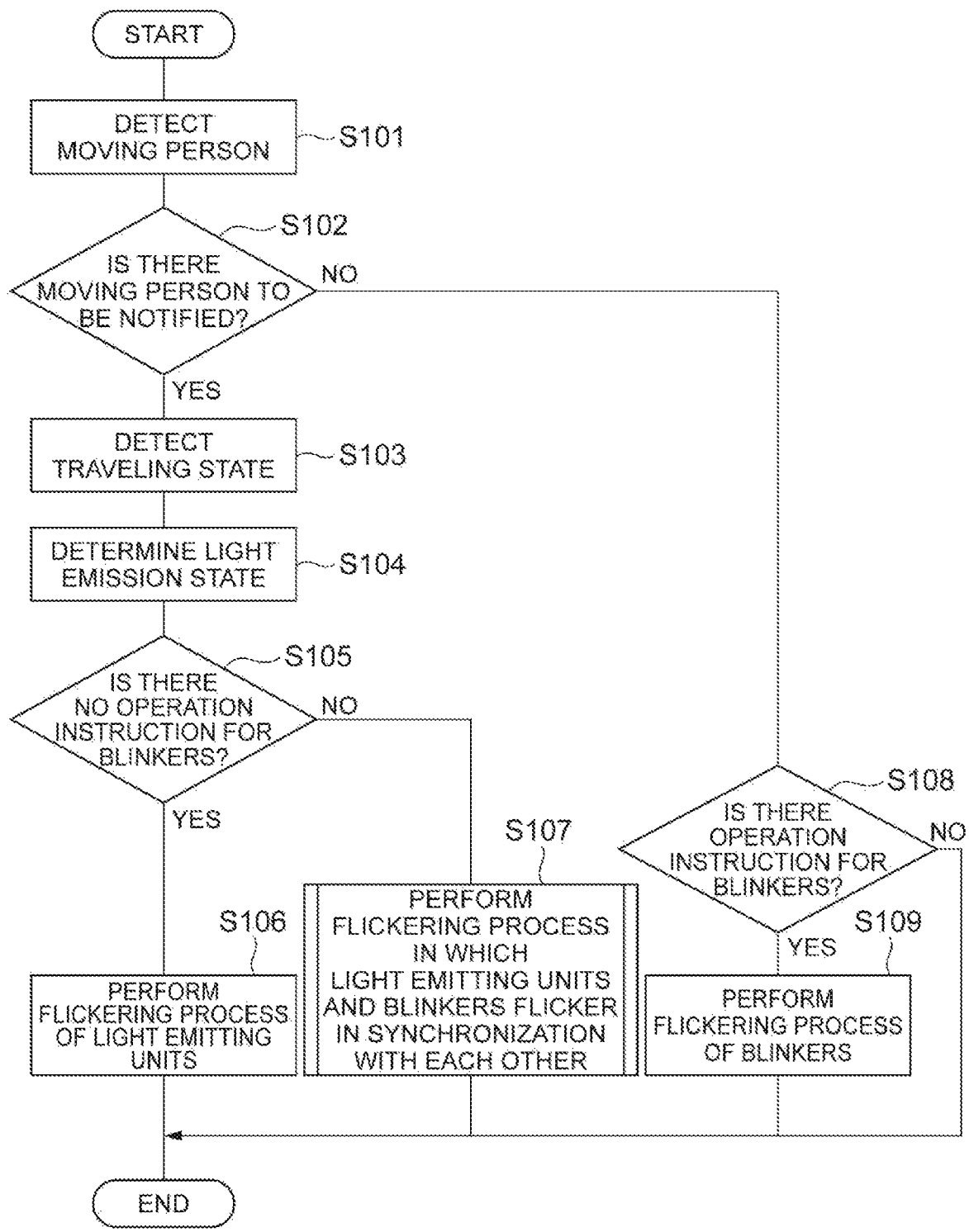

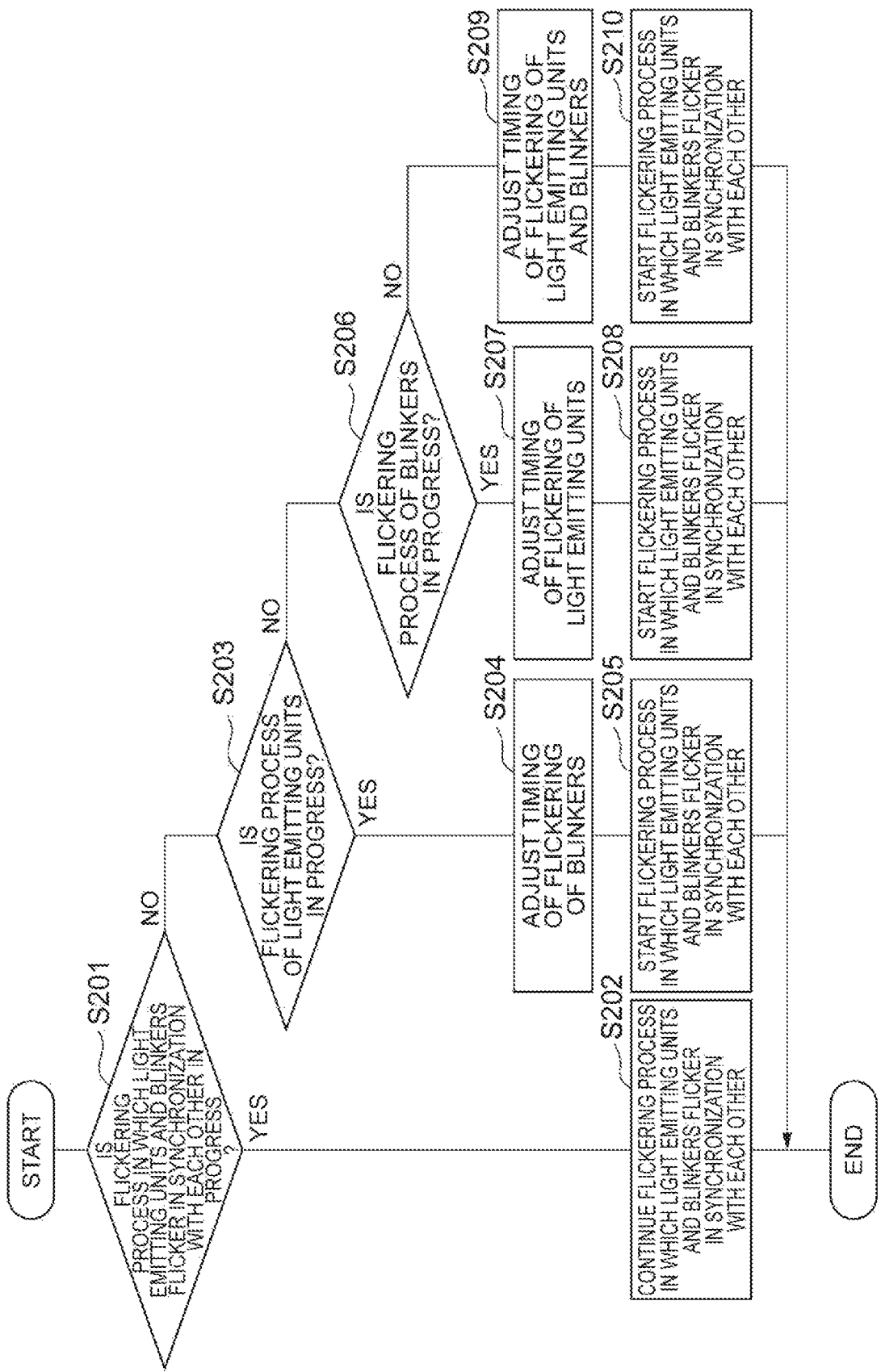

OUT-OF-VEHICLE NOTIFICATION DEVICE

CROSS-REFERENCE TO RELATED APPLICATION

This application claims the benefit of priority from Japanese Patent Application No. 2018-091248, filed on May 10, 2018, the entire contents of which are incorporated herein by reference.

TECHNICAL FIELD

The present disclosure relates to an out-of-vehicle notification device that performs notification of information with respect to the outside of a vehicle by using light.

BACKGROUND

A device that provides information related to traveling of a vehicle to a nearby pedestrian from the vehicle while the vehicle is being automatically driven is described in specification of UK Unexamined Patent Publication No. 2531084. The device notifies the pedestrian of information on whether to make way for the pedestrian or not by causing a light emitting unit to emit light. Accordingly, the pedestrian can act according to the notification.

SUMMARY

In the case of the device described in specification of UK Unexamined Patent Publication No. 2531084, when a blinker of the vehicle is operated (flickering) while notification of information is being performed with the light emitting unit flickering, a case where the light emitting unit and the blinker flicker in synchronization with each other and a case where the light emitting unit and the blinker flicker without being synchronized with each other may coexist although depending on the timing of the flickering of the light emitting unit and the blinker. When a case where the light emitting unit and the blinker flicker in synchronization with each other and a case where the light emitting unit and the blinker flicker without being synchronized with each other coexist, there is a possibility of a decrease in visibility of the flickering of the light emitting unit and the blinker such that a nearby pedestrian cannot know which of the light emitting unit and the blinker flicker is flickering or the like. Therefore, in this technical field, an out-of-vehicle notification device, with which it is possible to control the timing of the flickering of the light emitting unit and the blinker, is desired.

An out-of-vehicle notification device according to an aspect of the present disclosure is an out-of-vehicle notification device which performs notification of information with respect to a vicinity of a host vehicle by using light, the device including: a light emitting unit configured to notify a moving person in the vicinity of the host vehicle of information by using light; a light emission control unit configured to cause the light emitting unit to flicker corresponding to a traveling state of the host vehicle in a forward-backward direction; a blinker configured to perform notification about a steering direction of the host vehicle with respect to an outside of the host vehicle by using light; a blinker control unit configured to cause the blinker to flicker based on an operation instruction for the blinker, and a flickering adjustment unit configured to adjust timing of flickering at which the light emitting unit is caused to flicker by the light emission control unit and timing of flickering at which the blinker is caused to flicker by the blinker control unit.

The out-of-vehicle notification device is provided with the flickering adjustment unit. Therefore, it is possible to adjust the timing of the flickering of the light emitting unit and the blinker. Accordingly, the out-of-vehicle notification device can control the flickering of the light emitting unit and the blinker such that a case where the light emitting unit and the blinker flicker in synchronization with each other and a case where the light emitting unit and the blinker flicker without being synchronized with each other do not coexist or the like, for example.

In the out-of-vehicle notification device, the flickering adjustment unit may be configured to cause the blinker control unit to control timing of flickering of the blinker such that the blinker flickers in synchronization with timing of flickering of the light emitting unit when the light emitting unit is being caused to flicker by the light emission control unit at a time when the blinker control unit starts to perform control for causing the blinker to flicker. As described above, in the case of the out-of-vehicle notification device, it is possible to cause the blinker to flicker in synchronization with the light emitting unit even when the light emitting unit starts to flicker earlier. Since the light emitting unit and the blinker flicker in synchronization with each other, the moving person in the vicinity of the host vehicle can visually recognize the flickering of the light emitting unit and the blinker with ease even when the light emitting unit and the blinker flicker at the same time. As described above, in the case of the out-of-vehicle notification device, it is possible to improve the visibility of the flickering of the light emitting unit and the blinker with the light emitting unit and the blinker flickering in synchronization with each other.

In the out-of-vehicle notification device, the flickering adjustment unit may be configured to cause the light emission control unit to control timing of flickering of the light emitting unit such that the light emitting unit flickers in synchronization with timing of flickering of the blinker when the blinker is being caused to flicker by the blinker control unit at a time when the light emission control unit starts to perform control for causing the light emitting unit to flicker. As described above, in the case of the out-of-vehicle notification device, it is possible to cause the light emitting unit to flicker in synchronization with the blinker even when the blinker starts to flicker earlier. Since the light emitting unit and the blinker flicker in synchronization with each other, the moving person in the vicinity of the host vehicle can visually recognize the flickering of the light emitting unit and the blinker with ease even when the light emitting unit and the blinker flicker at the same time. As described above, in the case of the out-of-vehicle notification device, it is possible to improve the visibility of the flickering of the light emitting unit and the blinker with the light emitting unit and the blinker flickering in synchronization with each other.

According to the aspect of the present disclosure, it is possible to adjust the timing of the flickering of a light emitting unit and a blinker.

BRIEF DESCRIPTION OF THE DRAWINGS

FIG. 3 is a flowchart illustrating the flow of a process in which the out-of-vehicle notification device causes the light emitting units and the blinkers to flicker.

FIG. 4 is a flowchart illustrating the details of a flickering process in FIG. 3 in which the light emitting units and the blinkers are synchronized with each other.

DETAILED DESCRIPTION

Figure 1:
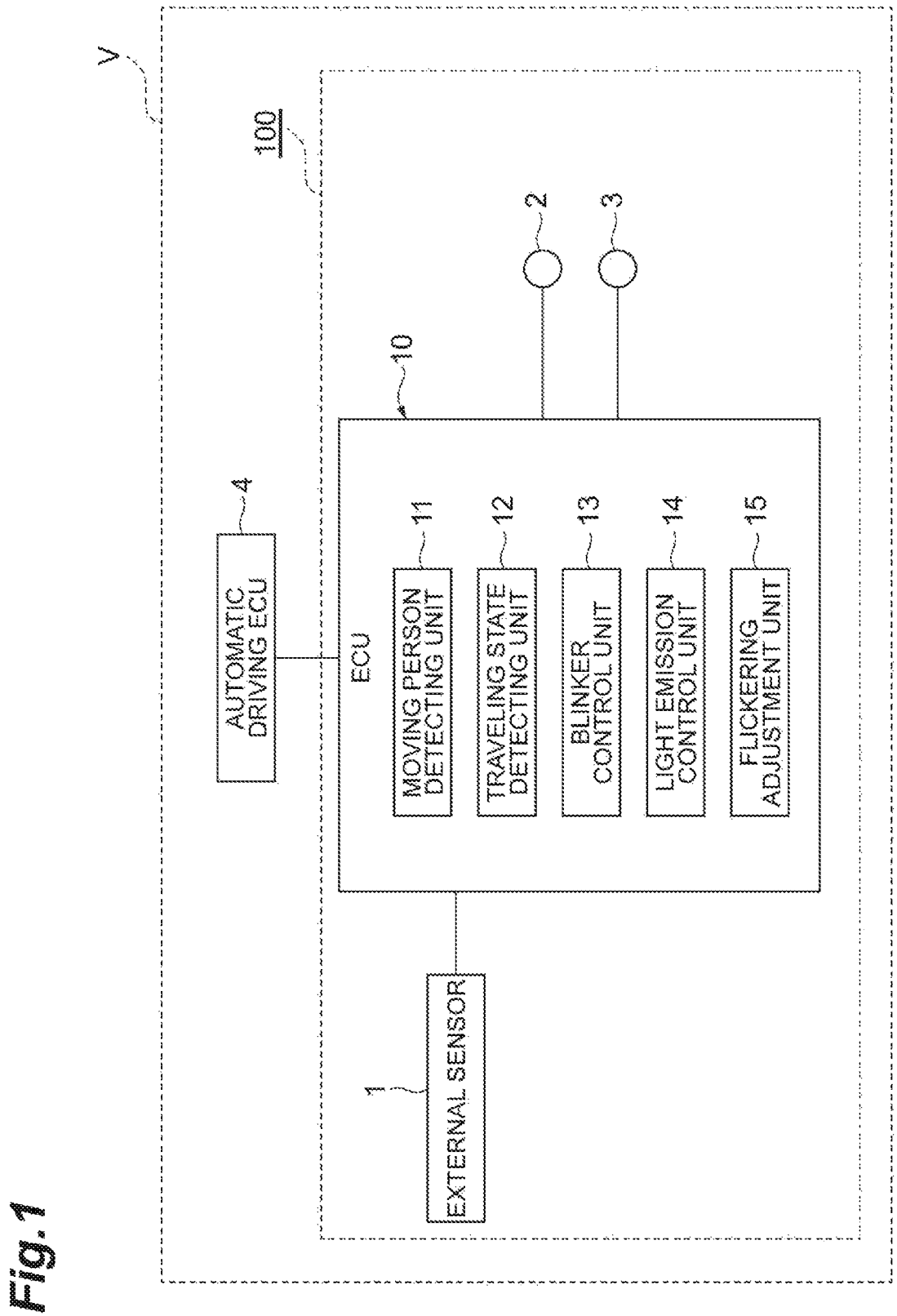
FIG. 1 is a block diagram illustrating an out-of-vehicle notification device according to an embodiment.

Hereinafter, an embodiment of the present disclosure will be described with reference to drawings. Note that, the same elements will be given the same reference numerals in the description of the drawings and description thereof will not be repeated.

As shown in FIG. 1, an out-of-vehicle notification device 100 is a device that is installed in a host vehicle V such as a passenger car that can be automatically driven, the device performing notification of information with respect to the vicinity of the host vehicle V by using light while the host vehicle V is being automatically driven. Specifically, the out-of-vehicle notification device 100 notifies a moving person in the vicinity of the host vehicle V of information by causing light emitting units 2 to flicker and notifies the moving person of a steering direction by causing a blinker to flicker. Automatic driving is vehicle control that causes the host vehicle V to automatically travel along a target route set in advance. In the case of the automatic driving, a driver does not need to perform a driving operation and the host vehicle V travels automatically. The moving person, who may be a target to be notified of information by means of the flickering of the light emitting units 2, is a pedestrian in the vicinity of the host vehicle V, a person on a bicycle, or the like.

The out-of-vehicle notification device 100 is provided with an electronic control unit (ECU) 10 that controls the entire device, an external sensor 1, the light emitting units 2, and blinkers 3. An automatic driving ECU 4 is further connected to the ECU 10. The ECU 10 is an electronic control unit including a central processing unit (CPU), a read only memory (ROM), a random access memory (RAM), a controller area network (CAN) communication circuit, and the like.

The ECU 10 is connected to, for example, a network that performs communication by using the CAN communication circuit and the ECU 10 is connected such that the ECU 10 can communicate with each component of the host vehicle V. That is, the ECU 10 can refer to the result of detection performed by the external sensor 1 and various kinds of information or the like related to traveling control of the host vehicle V from the automatic driving ECU 4. The ECU 10 can output a control signal for controlling the flickering of the light emitting units 2 and a control signal for causing the blinkers 3 to flicker.

The ECU 10 loads a program stored in the ROM into the RAM and executes the program loaded in the RAM with the CPU so as to realize out-of-vehicle notification functions which will be described later. The ECU 10 may include a plurality of ECUs.

The external sensor 1 is a detecting device that is installed in the host vehicle V and that detects a situation in the vicinity of the host vehicle V. The external sensor 1 includes at least one of a camera and a radar sensor.

The camera is an imaging device that images the outside situation in the vicinity of the host vehicle V. The camera is provided such that the camera can image the vicinity of the host vehicle V. The camera transmits imaging information related to the outside situation of the host vehicle V to the ECU 10. The camera may be a monocular camera and may be a stereo camera. The stereo camera includes two imaging units disposed such that the binocular parallax is realized. Imaging information of the stereo camera includes depth direction information also.

The radar sensor is a detecting device that detects an obstacle in the vicinity of the host vehicle V by using a radio wave (for example, millimeter wave) or light. Examples of the radar sensor include a millimeter wave radar and a light detection and ranging (LIDAR). The radar sensor detects an obstacle by transmitting a radio wave or light to the vicinity of the host vehicle V and receiving the radio wave or light reflected by the obstacle. The radar sensor transmits information about the detected obstacle to the ECU 10. Examples of the obstacle include a moving obstacle such as a pedestrian and a vehicle in addition to a fixed obstacle such as a guardrail and a building.

The light emitting units 2 are provided on an outer surface of the host vehicle V and perform notification of information with respect to a moving person in the vicinity of the host vehicle V by using light. The light emitting unit 2 is provided with, for example, a light emitting device such as an LED. The light emitting units 2 flicker while emitting monochromatic light or multi-chromatic light based on control performed by the ECU 10 so as to perform notification of information related to the traveling state of the host vehicle V. A plurality of the light emitting units 2 may be provided.

The blinkers 3 flicker while emitting light of a predetermined color so as to perform notification about the steering direction of the host vehicle V with respect to the vicinity of the host vehicle V.

Figure 2:
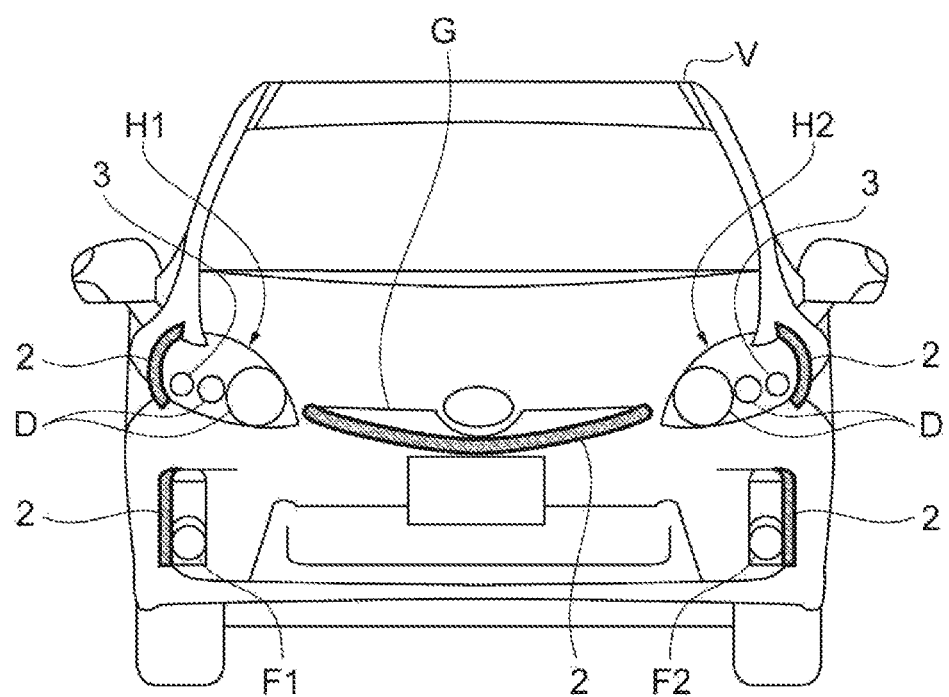
FIG. 2 is a front view of a host vehicle which illustrates the installation positions of light emitting units and blinkers.

Here, the installation positions of the light emitting units 2 or the like will be described. In the present embodiment, the plurality of light emitting units 2 are provided on the front surface of the host vehicle V. As illustrated in FIG. 2, a front surface of the host vehicle V is provided with a right head light unit H1, a left head light unit H2, a right fog lamp F1, a left fog lamp F2, and a front grille G. In the present embodiment, the light emitting unit 2 is provided at each of a position adjacent to the right head light unit H1, a position adjacent to the left head light unit H2, a position adjacent to the right fog lamp F, a position adjacent to the left fog lamp F2, and a position adjacent to the front grille G.

Note that, the blinker 3 on a right side and head lights D on the right side are incorporated into the right head light unit H1. The blinker 3 on a left side and the head lights D on the left side are incorporated into the left head light unit H2.

The automatic driving ECU 4 executes automatic driving of the host vehicle V. The automatic driving ECU 4 is an electronic control unit including a CPU, a ROM, a RAM, a CAN communication circuit, and the like. The automatic driving ECU 4 is connected to a map data base storing map information, a position measuring unit that measures the position of the host vehicle V in a map with a global positioning system (GPS), various actuators for causing the host vehicle V to travel, and various sensors including the external sensor 1.

The automatic driving ECU 4 is connected to a network that performs communication by using, for example, the CAN communication circuit and is connected such that the automatic driving ECU 4 can communicate with each component of the host vehicle V. That is, the automatic driving ECU 4 can refer to the map information of the map data base, information about the position of the host vehicle V in the map that is measured by the position measuring unit, and the result of detection performed by the various sensors. The ECU 10 can output signals to the various actuators.

The automatic driving ECU 4 loads a program stored in the ROM into the RAM and executes the program loaded in the RAM with the CPU so as to realize functions of an automatic driving system installed in the host vehicle V. The automatic driving ECU 4 may include a plurality of ECUs.

The map information of the map data base includes, for example, position information of a road (position information for each lane), information about the shape of a road (for example, information about type of curve or straight portion, curvature of curve, or like), information about the width of a road (information about width of lane), information about the slope of a road, information about the cant angle of a road, information about the speed limit for a road, and information about a road marking such as a crosswalk provided on a road. The various actuators include a steering actuator that controls the steering angle of the host vehicle V, a brake actuator that controls a brake system of the host vehicle V, and an engine actuator that controls an engine of the host vehicle V (or motor of electric car).

The automatic driving ECU 4 searches for a target route from the current position of the host vehicle V to a destination based on the map information of the map data base, the information about the position of the host vehicle V in the map that is measured by the position measuring unit, and a destination set in advance. The automatic driving ECU 4 generates a traveling plan for causing the host vehicle V to travel along the target route. The traveling plan includes, for example, a moving route and a moving speed. The automatic driving ECU 4 generates the traveling plan of the host vehicle V by using a known method. The automatic driving ECU 4 executes automatic driving of the host vehicle V according to the traveling plan based on the information about the position of the host vehicle V in the map that is measured by the position measuring unit. In addition, the automatic driving ECU 4 transmits the generated traveling plan to the ECU 10. The automatic driving ECU 4 executes the automatic driving by controlling the host vehicle V by transmitting a control signal to the various actuators.

The traveling plan, which is generated by the automatic driving ECU 4, includes an operation instruction for operating the blinkers 3 when the host vehicle V changes lanes. As described later, the out-of-vehicle notification device 100 can cause the blinkers 3 to operate (flicker) based on the operation instruction.

The ECU 10 includes a moving person detecting unit 11, a traveling state detecting unit 12, a blinker control unit 13, a light emission control unit 14, and a flickering adjustment unit 15. Note that, a portion of the functions of the ECU 10 may be executed by a computer in a facility such as an information management center that can communicate with the host vehicle V and may be executed by a portable information terminal that can communicate with the host vehicle V.

The moving person detecting unit 11 detects a moving person in the vicinity of the host vehicle V based on the result of detection performed by the external sensor 1. The moving person detecting unit 11 can detect the moving person by using a known method based on the result of detection performed by the external sensor 1.

Furthermore, the moving person detecting unit 11 detects a moving person to be notified who is a target to be notified of information by means of the flickering of the light emitting units 2 from among detected moving persons. In the present embodiment, the moving person detecting unit 11 may detect a moving person expected to cross over a road in front of the host vehicle V as the moving person to be notified. In addition, the moving person detecting unit 11 may detect a moving person within a predetermined area around the host vehicle V as the moving person to be notified. The moving person detecting unit 11 can detect the moving person to be notified by using a known method based on the result of detection performed by the external sensor 1. For example, the moving person detecting unit 11 may determine whether a moving person is the moving person expected to cross over a road (moving person to be notified) or not based on a change in position of the moving person (vector).

The traveling state detecting unit 12 detects the traveling state of the host vehicle V. In the present embodiment, the traveling state detecting unit 12 can detect the traveling state based on the traveling plan generated by the automatic driving ECU 4. Here, the traveling state detecting unit 12 detects the traveling state of the host vehicle V in a forward-backward direction. The traveling state of the host vehicle V in the forward-backward direction is the behavior of the host vehicle V in the forward-backward direction. The traveling state detecting unit 12 detects whether the host vehicle V is in a normal traveling state or not, whether the speed of the host vehicle V is decelerating or not, whether the host vehicle V is stopped or not, whether the speed of the host vehicle V is in the middle of acceleration or not, or the like as the traveling state of the host vehicle V in the forward-backward direction. Note that, the traveling state detecting unit 12 may detect the traveling state in the forward-backward direction based on information other than the traveling plan by using the speed of the host vehicle V or the like.

The blinker control unit 13 causes the blinkers 3 to flicker at a predetermined cycle based on the operation instruction for the blinkers 3. Specifically, the blinker control unit 13 causes the blinkers 3 to flicker based on the operation instruction for the blinkers 3 which is included in the traveling plan generated by the automatic driving ECU 4.

In addition, when the blinker control unit 13 starts to perform control for causing the blinkers 3 to flicker, the blinker control unit 13 controls the timing of the flickering of the blinkers 3 based on an instruction from the flickering adjustment unit 15. More specifically, when the blinker control unit 13 starts to perform control for causing the blinkers 3 to flicker, the blinker control unit 13 controls the timing of the start of flickering based on the instruction from the flickering adjustment unit 15 such that the blinkers 3 flicker in synchronization with the timing of the flickering of the light emitting units 2.

The light emission control unit 14 controls light emission of the light emitting units 2. The light emission control unit 14 causes the light emitting units 2 to flicker when the moving person detecting unit 11 detects the moving person to be notified. When the moving person to be notified is not detected by the moving person detecting unit 11, the light emission control unit 14 does not cause the light emitting units 2 to flicker.

Note that, the light emission control unit 14 causes the light emitting units 2 to flicker corresponding to the traveling state of the host vehicle V in the forward-backward direction which is detected by the traveling state detecting unit 12. That is, the light emission control unit 14 determines a light emission state corresponding to the detected traveling state. Light emission states corresponding to traveling states are set in advance. Note that, in the present embodiment, the flickering cycle of the light emitting units 2 and the flickering cycle of the blinkers 3 are the same as each other.

The light emission states corresponding to traveling states are as follows. For example, when the traveling state of the host vehicle V is a traveling state in which the host vehicle V is decelerating, the light emission control unit 14 causes the light emitting units 2 to flicker while emitting orange light. For example, when the traveling state of the host vehicle V is a traveling state in which the host vehicle V in a stopped state will depart, the light emission control unit 14 causes the light emitting units 2 to flicker while emitting green light. In this manner, the light emission control unit 14 causes the light emitting units 2 to flicker in various color corresponding to the traveling state of the host vehicle V so as to perform notification about the traveling state of the host vehicle V with respect to the moving person to be notified.

In addition, when the light emission control unit 14 starts to perform control for causing the light emitting units 2 to flicker, the light emission control unit 14 controls the timing of the flickering of the light emitting units 2 based on an instruction from the flickering adjustment unit 15. More specifically, when the light emission control unit 14 starts to perform control for causing the light emitting units 2 to flicker, the light emission control unit 14 controls the timing of the start of flickering based on the instruction from the flickering adjustment unit 15 such that the light emitting units 2 flicker in synchronization with the timing of the flickering of the blinkers 3.

The flickering adjustment unit 15 adjusts the timing of flickering at which the light emitting units 2 are caused to flicker by the light emission control unit 14 and the timing of flickering at which the blinkers 3 are caused to flicker by the blinker control unit 13. Here, the flickering adjustment unit 15 causes the light emission control unit 14 and the blinker control unit 13 to control the light emitting units 2 and the blinkers 3 respectively such that the light emitting units 2 and the blinkers 3 flicker in synchronization with each other.

More specifically, for example, there is a case where the light emitting units 2 are being caused to flicker by the light emission control unit 14 at a time when the blinker control unit 13 starts to perform control for causing the blinkers 3 to flicker. That is, there is a case where the blinkers 3 start to operate while notification about the traveling state of the host vehicle V is being performed with the light emitting units 2 flickering. In this case, the flickering adjustment unit 15 adjusts the timing of the flickering of the blinkers 3. Specifically, the flickering adjustment unit 15 outputs an instruction to the blinker control unit 13 such that the blinkers 3 flicker in synchronization with the timing of the flickering of the light emitting units 2 and causes the blinker control unit 13 to control the timing of the flickering of the blinkers 3.

For example, as an instruction with respect to the blinker control unit 13, the flickering adjustment unit 15 may acquire the timing of the flickering of the light emitting units 2 from the light emission control unit 14 and notify the blinker control unit 13 of the timing of the flickering of the light emitting units 2. Accordingly, the blinker control unit 13 can cause the blinkers 3 to start to flicker in synchronization with the light emitting units 2 based on the timing of the flickering of the light emitting units 2 which the blinker control unit 13 is notified of.

For example, there is a case where the blinkers 3 are being caused to flicker by the blinker control unit 13 at a time when the light emission control unit 14 starts to perform control for causing the light emitting units 2 to flicker. That is, there is a case where the light emitting units 2 start to perform notification about the traveling state while notification about the steering direction of the host vehicle V is being performed with the blinkers 3 flickering. In this case, the flickering adjustment unit 15 adjusts the timing of the flickering of the light emitting units 2. Specifically, the flickering adjustment unit 15 outputs an instruction to the light emission control unit 14 such that the light emitting units 2 flicker in synchronization with the timing of the flickering of the blinkers 3 and causes the light emission control unit 14 to control the timing of the flickering of the light emitting units 2.

For example, as an instruction with respect to the light emission control unit 14, the flickering adjustment unit 15 may acquire the timing of the flickering of the blinkers 3 from the blinker control unit 13 and notify the light emission control unit 14 of the timing of the flickering of the blinkers 3. Accordingly, the light emission control unit 14 can cause the light emitting units 2 to start to flicker in synchronization with the blinkers 3 based on the timing of the flickering of the blinkers 3 which the light emission control unit 14 is notified of.

For example, there is a case where the light emitting units 2 and the blinkers 3 start to flicker at the same time. In this case, the flickering adjustment unit 15 adjusts the timing of the flickering of the light emitting units 2 and the blinkers 3. Specifically, the flickering adjustment unit 15 outputs instructions to the light emission control unit 14 and the blinker control unit 13 to cause the light emission control unit 14 and the blinker control unit 13 to control the timing of the flickering of the light emitting units 2 and the blinkers 3 respectively such that the light emitting units 2 and the blinkers 3 flicker in synchronization with each other. For example, as instructions with respect to the light emission control unit 14 and the blinker control unit 13, the flickering adjustment unit 15 may output instructions related to the timing of the start of the flickering of the light emitting units 2 and the blinkers 3. The light emission control unit 14 and the blinker control unit 13 can cause the light emitting units 2 and the blinkers 3 to flicker in synchronization with each other by causing the light emitting units 2 and the blinkers 3 to start to flicker based on the instructions.

After a flickering process in which the light emitting units 2 and the blinkers 3 are caused to flicker in synchronization with each other is started, the flickering adjustment unit 15 causes the light emission control unit 14 and the blinker control unit 13 to continue a process in which the light emitting units 2 and the blinkers 3 are caused to flicker in synchronization with each other until there is no notification target moving person detected by the moving person detecting unit 11 or until the operation instruction for the blinkers 3 is terminated.

Next, the flow of a process in which the out-of-vehicle notification device 100 causes the light emitting units 2 and the blinkers 3 to flicker will be described by using a flowchart in FIG. 3. Note that, the process shown in FIG. 3 is restarted from the start when a predetermined time elapses after the process reaches the end. In addition, the process shown in FIG. 3 is executed while the host vehicle V is being automatically driven.

As shown in FIG. 3, the moving person detecting unit 11 detects a moving person in the vicinity of the host vehicle V based on the result of detection performed by the external sensor 1 (S101). The moving person detecting unit 11 determines whether there is a moving person to be notified such as a pedestrian expected to cross over a road in front of the host vehicle V based on the result of the detection performed by the external sensor 1 (S102). When there is no moving person to be notified (S102: NO), the blinker control unit 13 determines whether there is an operation instruction for the blinkers 3 (S108). When there is an operation instruction for the blinkers 3 (S108: YES), the blinker control unit 13 causes the blinkers 3 to flicker (S109). When there is no operation instruction for the blinkers 3 (S108: NO), the out-of-vehicle notification device 100 terminates the current process and restarts the process from the start after the predetermined time elapses.

Meanwhile, when the moving person detecting unit 11 determines that there is a moving person to be notified in S102 (S102: YES), the traveling state detecting unit 12 detects the traveling state of the host vehicle V (S103). The light emission control unit 14 determines the light emission state at the time of notification performed by means of the flickering of the light emitting units 2 based on the traveling state detected by the traveling state detecting unit 12 (S104). The blinker control unit 13 determines whether there is an operation instruction for the blinkers 3 (S105). When there is no operation instruction for the blinkers 3 (S105: Yes), the light emission control unit 14 performs notification by causing the light emitting units 2 to flicker such that the light emission state determined in S104 is achieved (S106). Meanwhile, when there is an operation instruction for the blinkers 3 (S105: NO), the flickering adjustment unit 15 causes the light emission control unit 14 and the blinker control unit 13 to perform a flickering process in which the light emitting units 2 and the blinkers 3 flicker in synchronization with each other (S107).

Next, the details of the flickering process in which the light emitting units 2 and the blinkers 3 flicker in synchronization with each other and which is performed in S107 of FIG. 3 will be described with reference to a flowchart in FIG. 4. The process shown in FIG. 4 is started when the process of the flowchart shown in FIG. 3 reaches S107 and is terminated when the process reaches the end. As shown in FIG. 4, the flickering adjustment unit 15 determines whether the flickering process in which the light emitting units 2 and the blinkers 3 flicker in synchronization with each other is in progress or not (S201). When the flickering process in which the light emitting units 2 and the blinkers 3 flicker in synchronization with each other is in progress (S201: YES), the flickering adjustment unit 15 causes the light emission control unit 14 and the blinker control unit 13 to continue the flickering process in which the light emitting units 2 and the blinkers 3 flicker in synchronization with each other (S202).

When the flickering adjustment unit 15 determines that the flickering process in which the light emitting units 2 and the blinkers 3 flicker in synchronization with each other is not in progress in S201 (S201: NO), the flickering adjustment unit 15 determines whether a flickering process of the light emitting units 2 is in progress or not (S203). When the flickering process of the light emitting units 2 is in progress (S203: YES), the flickering adjustment unit 15 adjusts the timing of the flickering of the blinkers 3 (S204). Note that, a case where the result of the determination in S203 is "YES" is a case where a flickering process of the blinkers 3 is started while the flickering process of the light emitting units 2 is being performed. In addition, as adjustment of the timing of flickering, specifically, the flickering adjustment unit 15 outputs an instruction to the blinker control unit 13 such that the blinkers 3 flicker in synchronization with the timing of the flickering of the light emitting units 2. The blinker control unit 13 starts the flickering process of the blinkers 3 based on the instruction from the flickering adjustment unit 15. Accordingly, the flickering process in which the light emitting units 2 and the blinkers 3 flicker in synchronization with each other is started (S205).

When the flickering adjustment unit 15 determines that the flickering process of the light emitting units 2 is not in progress in S203 (S203: NO), the flickering adjustment unit 15 determines whether the flickering process of the blinkers 3 is in progress or not (S206). When the flickering process of the blinkers 3 is in progress (S206: YES), the flickering adjustment unit 15 adjusts the timing of the flickering of the light emitting units 2 (S207). Note that, a case where the result of the determination in S206 is "YES" is a case where the flickering process of the light emitting units 2 is started while the flickering process of the blinkers 3 is being performed. As adjustment of the timing of flickering, specifically, the flickering adjustment unit 15 outputs an instruction to the light emission control unit 14 such that the light emitting units 2 flicker in synchronization with the timing of the flickering of the blinkers 3. The light emission control unit 14 starts the flickering process of the light emitting units 2 based on the instruction from the flickering adjustment unit 15. Accordingly, the flickering process in which the light emitting units 2 and the blinkers 3 flicker in synchronization with each other is started (S208).

When the flickering adjustment unit 15 determines that the flickering process of the blinkers 3 is not in progress in S206 (S206: NO), the flickering adjustment unit 15 adjusts the timing of the flickering of the light emitting units 2 and the blinkers 3 (S209). Note that, a case where the result of the determination in S206 is "NO" is a case where the light emitting units 2 and the blinkers 3 start to flicker at the same time from a state where the light emitting units 2 and the blinkers 3 do not flicker. As adjustment of the timing of flickering, specifically, the flickering adjustment unit 15 outputs an instruction to the light emission control unit 14 and the blinker control unit 13 such that the light emitting units 2 and the blinkers 3 flicker in synchronization with each other. The light emission control unit 14 and the blinker control unit 13 start the flickering process of the light emitting units 2 and the blinkers 3 respectively based on the instruction from the flickering adjustment unit 15. Accordingly, the flickering process in which the light emitting units 2 and the blinkers 3 flicker in synchronization with each other is started (S208).

As described above, the out-of-vehicle notification device 100 is provided with the flickering adjustment unit 15. Therefore, is possible to adjust the timing of the flickering of the light emitting units 2 and the blinkers 3. In addition, the flickering adjustment unit 15 causes the light emission control unit 14 and the blinker control unit 13 to control the light emitting units 2 and the blinkers 3 respectively such that the light emitting units 2 and the blinker 3 flicker in synchronization with each other. That is, a case where the light emitting units 2 and the blinkers 3 flicker in synchronization with each other and a case where the light emitting units 2 and the blinkers 3 flicker without being synchronized with each other do not coexist. Since the light emitting units 2 and the blinkers 3 flicker in synchronization with each other as described above, the moving person to be notified who is in the vicinity of the host vehicle V can visually recognize the flickering of the light emitting units 2 and the blinkers 3 with ease even when the light emitting units 2 and the blinkers 3 flicker at the same time. As described above, in the case of the out-of-vehicle notification device 100, it is possible to improve the visibility of the flickering of the light emitting units 2 and the blinkers 3 with the light emitting units 2 and the blinkers 3 flickering in synchronization with each other.

When the flickering process of the blinkers 3 is started while the flickering process of the light emitting units 2 is being performed, the flickering adjustment unit 15 causes the blinker control unit 13 to control the timing of the flickering of the blinkers 3 such that the blinkers 3 flicker in synchronization with the timing of the flickering of the light emitting units 2. Accordingly, in the case of the out-of-vehicle notification device 100, it is possible to cause the blinkers 3 to flicker in synchronization with the light emitting units 2 even when the light emitting units 2 start to flicker earlier.

When the flickering process of the light emitting units 2 is started while the flickering process of the blinkers 3 is being performed, the flickering adjustment unit 15 causes the light emission control unit 14 to control the timing of the flickering of the light emitting units 2 such that the light emitting units 2 flicker in synchronization with the timing of the flickering of the blinkers 3. Accordingly, in the case of the out-of-vehicle notification device 100, it is possible to cause the light emitting units 2 to flicker in synchronization with the blinkers 3 even when the blinkers 3 start to flicker earlier.

When the light emitting units 2 and the blinkers 3 start to flicker at the same time, the flickering adjustment unit 15 causes the light emission control unit 14 and the blinker control unit 13 to control the timing of the flickering of the light emitting units 2 and the blinkers 3 respectively such that the light emitting units 2 and the blinkers 3 flicker in synchronization with each other. Accordingly, in the case of the out-of-vehicle notification device 100, it is possible to cause the light emitting units 2 and the blinkers 3 to flicker in synchronization with each other even when the light emitting units 2 and the blinkers 3 start to flicker at the same time.

Hereinabove, the embodiment of the present disclosure has been described. However, the present disclosure is not limited to the above-described embodiment. For example, the flickering adjustment unit 15 may set the same flickering cycle and the same lighting time for the light emitting units 2 and the blinkers 3 and may adjust the timing of the flickering of the light emitting units 2 and the blinkers 3 such that the timing at which the light emitting units 2 are turned on and the timing at which the blinkers 3 are turned on become offset from each other. In addition, the flickering adjustment unit 15 may adjust the timing of the flickering of the light emitting units 2 and the blinkers 3 such that the light emitting units 2 and the blinkers 3 flicker in synchronization with each other in a reversed state. That is, the blinkers 3 may be turned off when the light emitting units 2 are turned on. Furthermore, for example, the flickering adjustment unit 15 may adjust the timing of the flickering of the light emitting units 2 and the blinkers 3 such that the light emitting units 2 and the blinkers 3 are turned on without being synchronized with each other by setting a ratio between the lighting time of the light emitting units 2 and the lighting time of the blinkers 3 to an irrational number or the like. Even in these cases, a case where the light emitting units 2 and the blinkers 3 flicker in synchronization with each other and a case where the light emitting units 2 and the blinkers 3 flicker without being synchronized with each other do not coexist. Therefore, in the case of the out-of-vehicle notification device 100, it is possible to improve the visibility of the flickering of the light emitting units 2 and the blinkers 3. As described above, it is sufficient that the flickering adjustment unit 15 adjusts the timing of the flickering of the light emitting units 2 and the blinkers 3 such that a case where the light emitting units 2 and the blinkers 3 flicker in synchronization with each other and a case where the light emitting units 2 and the blinkers 3 flicker without being synchronized with each other do not coexist when the light emitting units 2 and the blinkers 3 are turned on.

In addition, the light emission control unit 14 may cause the light emitting units 2 to flicker at different flickering cycles corresponding to the traveling state of the host vehicle V. In this case, the flickering adjustment unit 15 may adjust the flickering cycle of the blinkers 3 such that the blinkers 3 flicker in accordance with the flickering cycle of the light emitting units 2 when the light emitting units 2 and the blinkers 3 flicker in synchronization with each other. For example, if a range of the flickering cycle of the blinkers 3 is determined in advance in accordance with a rule or the like, the light emission control unit 14 may change the flickering cycle of the light emitting units 2 corresponding to the traveling state of the host vehicle V within the determined range of the flickering cycle of the blinkers 3.

In addition, examples of the moving person to be notified by the light emitting units 2 may include a driver of a manually driven vehicle traveling within a predetermined area around the host vehicle V in addition to a pedestrian and a person on a bicycle. For example, the moving person detecting unit 11 may specify an automatically driven vehicle through wireless communication with vehicles traveling in the vicinity of the host vehicle V and detect a vehicle other than the specified automatically driven vehicle as a manually driven vehicle. In this case, the driver of the manually driven vehicle can figure out the traveling state of the host vehicle V by visually recognizing the flickering of the light emitting units 2.

The out-of-vehicle notification device 100 may not be installed in an automatically driven vehicle. The out-of-vehicle notification device 100 may be installed in a manually driven vehicle. In this case, the blinker control unit 13 may cause the blinkers 3 to flicker based on an operation instruction for the blinkers 3 which is issued by the driver of the host vehicle.

What is claimed is:

1. An out-of-vehicle notification device which performs notification of information with respect to a vicinity of a host vehicle by using light, the device comprising:
   a light emitting unit configured to notify a moving person in the vicinity of the host vehicle of information by using light;
   a light emission control unit configured to cause the light emitting unit to flicker corresponding to a traveling state of the host vehicle in a forward-backward direction;
   a blinker configured to perform notification about a steering direction of the host vehicle with respect to an outside of the host vehicle by using light;
   a blinker control unit configured to cause the blinker to flicker based on an operation instruction for the blinker; and
   a flickering adjustment unit configured to adjust timing of flickering at which the light emitting unit is caused to flicker by the light emission control unit and timing of flickering at which the blinker is caused to flicker by the blinker control unit,
   wherein the flickering adjustment unit is configured to cause the blinker control unit to control timing of flickering of the blinker such that the blinker flickers in synchronization with timing of flickering of the light emitting unit when the light emitting unit is being caused to flicker by the light emission control unit at a time when the blinker control unit starts to perform control for causing the blinker to flicker.

2. An out-of-vehicle notification device which performs notification of information with respect to a vicinity of a host vehicle by using light, the device comprising:
- a light emitting unit configured to notify a moving person in the vicinity of the host vehicle of information by using light;
- a light emission control unit configured to cause the light emitting unit to flicker corresponding to a traveling state of the host vehicle in a forward-backward direction;
- a blinker configured to perform notification about a steering direction of the host vehicle with respect to an outside of the host vehicle by using light;
- a blinker control unit configured to cause the blinker to flicker based on an operation instruction for the blinker; and
- a flickering adjustment unit configured to adjust timing of flickering at which the light emitting unit is caused to flicker by the light emission control unit and timing of flickering at which the blinker is caused to flicker by the blinker control unit,
- wherein the flickering adjustment unit is configured to cause the light emission control unit to control timing of flickering of the light emitting unit such that the light emitting unit flickers in synchronization with timing of flickering of the blinker when the blinker is being caused to flicker by the blinker control unit at a time when the light emission control unit starts to perform control for causing the light emitting unit to flicker.

* * * * *